United States Patent [19]

Johnson et al.

[11] 4,122,755
[45] Oct. 31, 1978

[54] SELF-LOCKING CHUCK

[75] Inventors: Charles R. Johnson, Howell; John K. Forlow, Wixom; Paul G. Black, Whitmore Lake, all of Mich.; William A. Mitchell; John S. Clark, both of Springfield, Vt.

[73] Assignee: Ex-Cell-O Corporation, Troy, Mich.

[21] Appl. No.: 767,176

[22] Filed: Feb. 9, 1977

Related U.S. Application Data

[63] Continuation-in-part of Ser. No. 739,390, Nov. 8, 1976, abandoned.

[51] Int. Cl.² ................................................ B23C 5/26
[52] U.S. Cl. .................................... 90/11 A; 90/11 D; 408/238; 408/239 A
[58] Field of Search ............ 90/11 D, 11 A; 408/226, 408/239, 239 A, 240, 710, 238; 279/1 A, 1 B, 1 TS, 22, 24, 30, 103

[56] References Cited

U.S. PATENT DOCUMENTS

| 2,037,307 | 4/1936 | Bowman | 279/24 X |
| 3,558,147 | 1/1971 | Johansson | 279/103 |
| 4,031,810 | 6/1977 | Nattefort | 90/11 A |

Primary Examiner—Gil Weidenfeld
Attorney, Agent, or Firm—James H. Bower; Mitchell J. Hill

[57] ABSTRACT

A tool holding assembly wherein a self-locking chuck or tool holder is releasably secured in a rotary spindle by a draw bar and collet type tool holder gripping means. The self-locking chuck is provided with a spring-biased, ball locking means that functions as a safety retainer means for holding the chuck or tool holder in the spindle in case of a breakage of the collet type tool holder gripping means. The spindle is provided with a tapered seat against which the balls of the ball locking means are normally urged by a spring biased plunger that is movable to a ball unlocking position by the draw bar.

6 Claims, 7 Drawing Figures

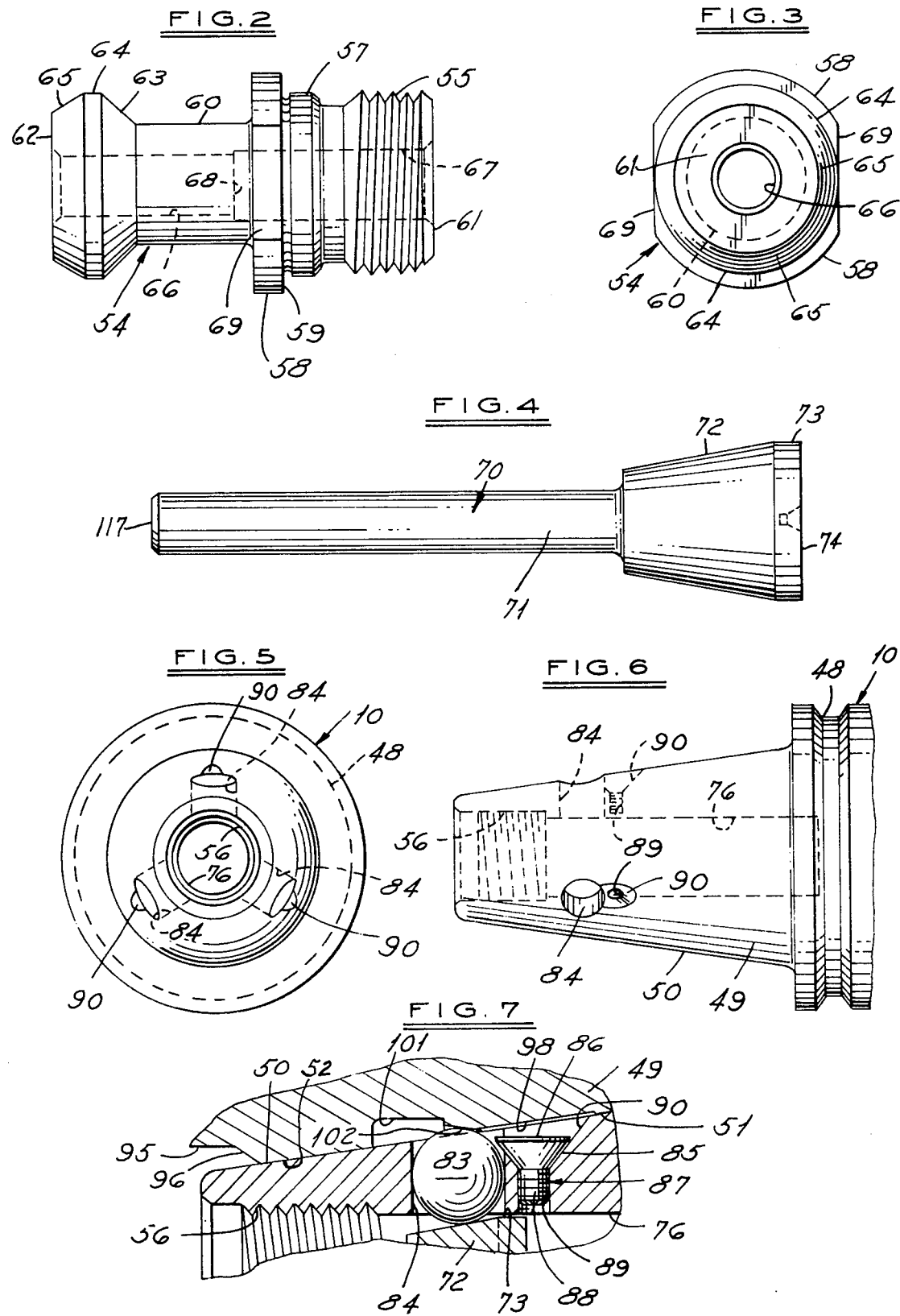

SELF-LOCKING CHUCK

This is a continuation-in-part application of application Ser. No. 739,390 filed Nov. 8, 1976, now abandoned.

BACKGROUND OF THE INVENTION

1. Field of the Invention

This invention relates to tool holder assemblies for use in machine tools which perform various types of opertions, such as milling, drilling, boring, tapping, and the like. The invention is particularly concerned with a tool holder assembly of the type wherein a tool holder or chuck is secured to a rotary spindle by a draw bar which functions to draw a tool holder into a tight frictional engagement with a seal formed in the spindle, and whereby the tool holder and the tool mounted thereon rotates with the spindle.

2. Description of the prior art

It is known in the machine tool art to provide tool holders or chucks which in turn are releasably mounted in a rotary spindle. The tool holder generally has a conical, or frusto-conical shank or body portion that is seated in a conical, or frusto-conical socket or recess formed in the rotary spindle. The tool holder is held in position by a draw bar and a tool holder gripping means, such as a collet means. The draw bar is axially movable with respect to the spindle, and when the draw bar is moved inwardly of the spindle, the collet means engages the tool holder and holds the tool holder in tight frictional engagement with the socket formed in the spindle so that the tool holder and the tool carried thereon rotates with the spindle. An example of the last described tool holder assembly is illustrated in U.S. Pat. No. 3,868,886.

SUMMARY OF THE INVENTION

In accordance with the present invention, the tool holder assembly includes a rotary spindle having a tool holder seat formed therein and a draw bar mounted in the spindle for axial movement with respect to the spindle between a tool holder locked position and a tool holder unlocked position. The spindle is provided with a tool holder seat comprising an inwardly coverging frusto-conical socket in which is seated a tool holder with a frusto-conical shank that is operatively mounted in said spindle socket. A collet type tool holder gripping means is operatively mounted in the spindle for releasable gripping engagement with the tool holder for releasably retaining the tool holder in the spindle. The draw bar is adapted to operate the collet type tool holder gripping means between the tool holder locked position and the tool holder unlocked position. The tool holder is provided with a safety means in the form of a self-locking means that is normally in a locked position for locking the tool holder in the spindle, and the self-locking means will positively retain the tool holder in the spindle in case of breakage of the collet type tool holder gripping means during high speed rotation of the spindle. The self-locking means is adapted to engage a frusto-conical inwardly converging seat formed in the spindle bore. The self-locking means comprises a plurality of spring biased locking balls which are moved into a locked position by a spring biased plunger. The spring biased plunger is adapted to be moved to a ball unlocking position by the draw bar when the draw bar is moved to a tool holder unlocked position.

Other features and advantages of this invention will be apparent from the following detailed description, appended claims, and the accompanying drawing.

BRIEF DESCRIPTION OF THE DRAWINGS

FIG. 2 is a side elevation view of a retention knob employed in the tool holder assembly illustrated in FIG. 1.

FIG. 3 is a left end elevation view of the retention knob illustrated in FIG. 2.

FIG. 4 is a side elevation view of a cam pin employed in the tool holder assembly illustrated in FIG. 1.

FIG. 5 is an end view of the tool holder body employed in the tool holder assembly illustrated in FIG. 1.

FIG. 6 is a partial, right side elevation view of the structure illustrated in FIG. 5.

FIG. 7 is a fragmentary, elevational section view of the self-locking ball structure employed in the tool holder assembly illustrated in FIG. 1.

DESCRIPTION OF THE PREFERRED EMBODIMENT

Figure 1:
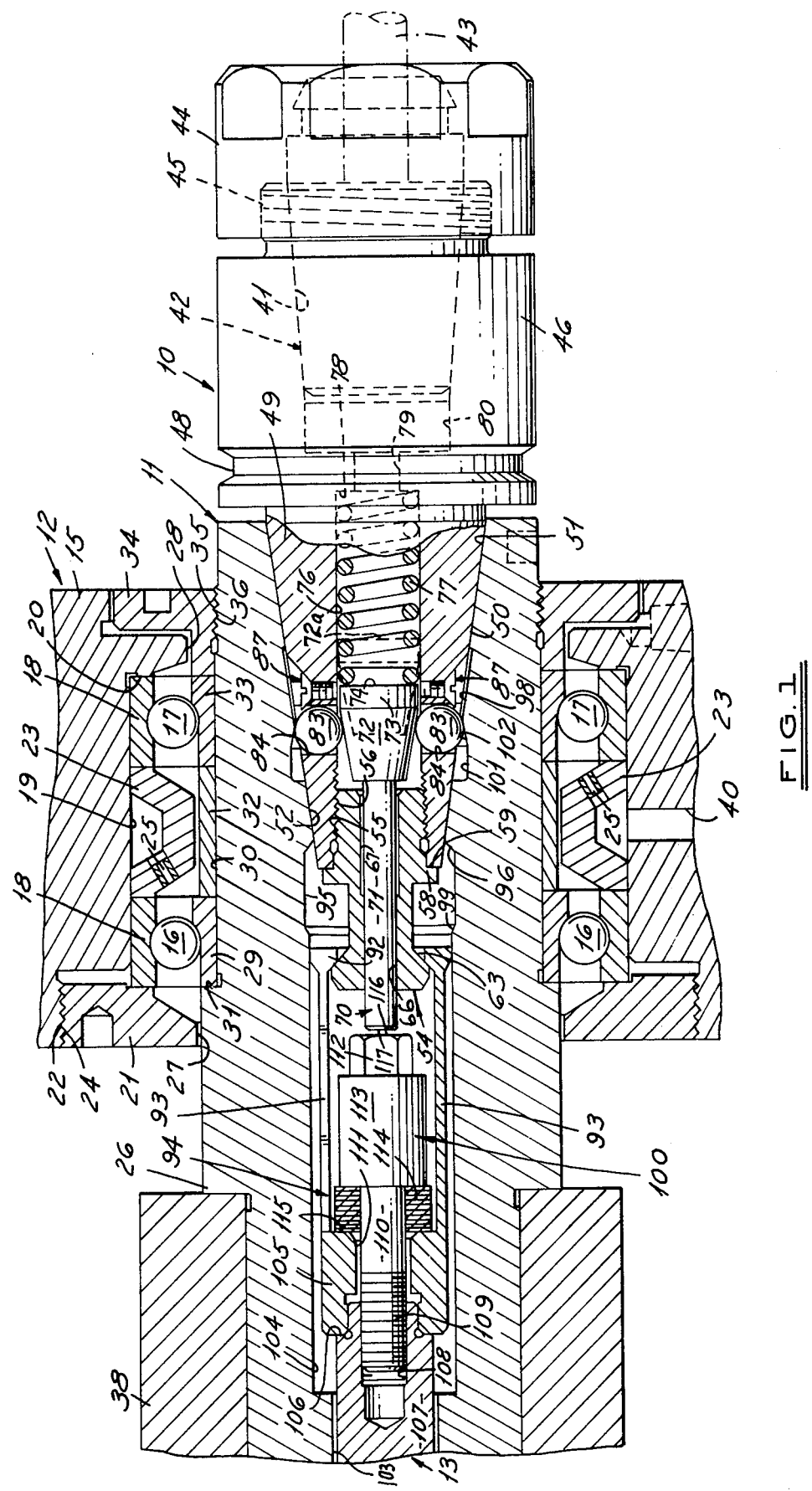
FIG. 1 is a fragmentary, longitudinal view, partly in section, of a machine having a tool holder assembly made in accordance with the principles of the present invention.

Referring now to the drawings, and in particular, to FIG. 1, the numeral 10 generally designates a self-locking chuck which is operatively mounted in a rotary machine tool spindle, generally indicated by the numeral 11. The spindle 11 is rotatably mounted within a spindle head which is generally indicated by the numeral 12. The numeral 13 generally designates a combined draw bar and tool holder gripping means. The spindle head 12 comprises a body 15 in which is operatively mounted a pair of rear and front ball bearings means 16 and 17, respectively, for rotatably supporting the rotary spindle 11. Each of the ball bearing means 16 and 17 includes an outer annular race 18 which is seated in a bore 19 that extends into the spindle head of the body 15 from the rear or left end thereof, as viewed in FIG. 1. The front outer bearing race 18 for the front bearing means 17 is seated against a shoulder 20 which is formed at the inner end of the bore 19. The outer bearing races 18 are spaced apart by a spreader ring 23 which is provided with a V-shaped cross section and a plurality of lubricant passages 25. The rear outer bearing race 18 is seated against a locking ring 21 which has a threaded outer periphery 22 that is threadably seated in a threaded bore 24 formed in the spindle body 15. The locking ring 21 functions to retain the bearing races 18 and the spreader ring 23 in their operative positions in the bore 19. The rotary spindle 11 includes an elongated cylindrical body 26 which extends through a central bore 27 which is formed through the locking ring 21. The spindle body 26 is extended forwardly through the spindle head body 15 and extends out through an enlarged bore 28 in the front end of the spindle head body 15.

The rear ball bearing means 16 is provided with an inner bearing race 29 which is seated around a reducer diameter portion 30 of the spindle body 26, and it is seated against a shoulder 31. An annular spacer sleeve 32 is mounted around the reduced diameter portion 30 of the spindle body 26, and it has one end thereof dispoed in an abutting relationship with the inner bearing race 29. The front inner bearing race 33 is disposed on the reduced diameter portion 30 of the spindle body 26 in a position abutting the front end of the spacer sleeve 32. The inner bearing races 29 adn 33, and the spacer sleeve 32 are retained axially in their operative positions on the spindle body 26 by a retainer collar 34. The retainer collar 34 has a bore 36 formed therethrough which is threaded at the outer end thereof for threadable engagement with the threaded periphery 35 on the outer end of the spindle body 26. As shown in FIG. 1, the numeral 38 indicates the rotor portion of a conventional electric drive motor for the rotary spindle 11. The numeral 40 designates a passage for inserting a lubricant oil into the housing or spindle body 15 supporting the bearing means 16 and 17.

As shown in FIG. 1, the self-locking chuck 10 includes a cylindrical body portion 46, in the front end of which is formed a tapered or frusto-conical tool adapter socket 41 that is open at its outer end and adapted to receive a mating conventional tool adapter, generally indicated by the numeral 42 and which carries a shaft 43 of a conventional cutting tool (not shown). The tool holder body 46 has integrally formed on the front end thereof a reduced diameter threaded portion 45 on which is threadably mounted a retainer nut 44 for retaining the tool holder 42 in place in the tapered socket 41. The numeral 48 designates a V-shaped annular slot formed in the outer periphery of the tool holder body 46 for the reception of a conventional tool changer arm employed in machines with which the tool holder assembly of the present invention would be used.

As shown in FIGS. 1 and 6, the self-locking chuck 10 is provided with the integral, tapered or frusto-conical shank 49 which has a tapered surface 50 for a two-point seating engagement with the surfaces of a pair of longitudinally spaced apart tapered or frusto-conical sockets or seats 51 and 52 that are formed in the front end of the spindle 11.

As shown in FIG. 1, a retention knob, generally indicated by the numeral 54, is operatively attached to the rear end of the chuck shank 49. The retention knob 54 is shown in detail in FIG. 2, and it includes a stepped annular body, including a threaded front end portion 55 which is threadably mounted in an axial bore 56 formed in the rear end of the chuck shank 49. The retention knob 54 further includes a radial extension 57 which is of the same diameter as the outer dimension of the threaded portion 55 so as to be slidably engaged in the outer non-threaded portion of the bore 55, as shown in FIG. 1. The retention knob 54 includes a radially extended annular flange 58 which has a pair of flat side faces or wrench flats 69 (FIG. 3) which are disposed diametrically opposite to each other and which are parallel to each other. The inner side face 59 of the flange 58 is adapted to be seated against the outer end of the tool holder tapered shank 49, as shown in FIG. 1, when the retention knob 54 is operatively attached to the shank 49.

As shown in FIG. 2, the retention knob 54 further includes an integral, rearwardly extended body portion 60 which has a reduced diameter cylindrical surface that extends between the annular flange 58 and the inner end of an inwardly tapered or frusto-conical collet cam surface 63. The collet cam surface 63 terminates at its outer end at one end of an annular shoulder 64. The retention knob 54 is provided on its outer end with an inwardly tapered or frusto-conical surface 65 that terminates at the transverse rear end 62 of the retention knob 54. The numeral 61 designates the inner end of the retention knob 54. As shown in FIGS. 2 and 3, the retention knob 54 is provided with an axial bore 66 which extends inwardly from the outer end 62 and which communicates at the point indicated by the numeral 68 with an enlarged axial bore 67 that extends inwardly from the inner end of the retention knob 54.

As shown in FIGS. 1 and 4, a cam pin or spring plunger, generally indicated by the numeral 70, is provided with an elongated, cylindrical shaft 71 which is slidably mounted through the bores 66 and 67 in the retention knob 54. The rear end of the cam pin 70 extends outwardly beyond the outer end 62 of the retention knob 54. Integrally attached to the front end of the cam pin shaft 71 is a tapered or frusto-conical body portion 72 which has integrally formed on its outer side an annular shoulder 73. As shown in FIG. 1, the annular shoulder 73 on the cam pin 70 is slidably mounted within an axial bore 76 which is formed in the tool holder shank 49. The bore 76 communicates at its outer end with the threaded bore 56. The inner end of the bore 76 is designated by the numeral 78 and it forms a shoulder for supporting the inner end of a compression spring 77. The outer end of the compression spring 77 abuts the inner face 74 of the cam pin body shoulder 73 and normally biases the cam pin or plunger 70 outwardly of the tool holder shank 49 to the locking position shown in FIG. 1. As shown in FIG. 1, the bore 76 communicates at its inner end with a reduced diameter bore 79. The bore 79 in turn communicates with an enlarged bore 80 formed in the tool holder body 46. The bore 80 communicates with the inner end of the tapered tool holder socket 41.

As illustrated in FIGS. 1 and 5 through 7, the tool holder body shank 49 is provided adjacent its rear end with three radially extended bores 84 which are equally spaced circumferentially around the tapered shank 49, and which communicate with the bore 76 at their inner ends. A locking ball 83 is movably mounted within each of the bores 84, and it is adapted to be engaged by the frusto-conical body portion 72 of the plunger 70. Each of the locking balls 83 is retained in its respective bore 84 by a retainer screw, generally indicated by the numeral 87. As best seen in FIG. 7, each of the retainer screws 87 is provided with a threaded body 88 which is threadably mounted in a threaded bore 89 that is disposed parallel to, but spaced from the adjacent bore 84. The inner ends of the bores 89 communicate with the longitudinal bore 76 formed through the tool holder shank 49. Each of the ball retainer screws 87 includes a screw head 86 which has a frusto-conical or inwardly tapered side surface 85 that is adapted to be seated in a conical hole 90 that extends inwardly from the outer surface 50 of the tool holder shank 49 and which communicates with the adjacent bore 89. The retainer screw head surface 85 engages the adjacent locking ball 83 to retain it in the bore 84 against axial movement completely out of the bore 84, but yet to permit an axial locking movement of the ball 83 in the bore 84, as explained more fully hereinafter.

As shown in FIG. 1, the self-locking chuck 10 is releasably retained in the spindle 11 by a collet means, generally indicated by the numeral 94. The collet 94 is a conventional expandable and ontractible collet, which has a body portion 105 from which longitudinally extends a plurality of radially expandable and contractible spring fingers 93. Each of the spring fingers 93 is provided on the outer end thereof will an integral enlarged portion or lug 92 which has a frusto-conical inner end surface that engages the tapered cam surface 63 on the retention knob 54 to retain the self-locking chuck 10 in the locked position shown in FIG. 1, when the collet 94 is moved to the locked position shown in FIG. 1.

In the locked position shown in FIG. 1, the outer periphery of the collet lugs 92 are in slidable engagement with the surface of a longitudinally extended axial bore 104 in the spindle 11 which communicates at its outer end with an enlarged bore 95 in the spindle 11. A short tapered bore 99 in the spindle 11 connects the outer end of the bore 104 and the inner end of the enlarged cylindrical bore 95. The bore 99 functions as a collet cam surface for the collet lugs 92, as explained hereinafter. The outer end of the bore 95 is connected by a tapered bore or frusto-conical surface 96 to the inner end of the tapered tool holder seat 52 in the spindle 11. The outer end of the inner tapered chuck seat 52 communicates with a radial, outward extended recess 101 which terminates at its forward end at an inwardly diverging tapered surface 102 in the spindle 11. The tapered surface 102 terminates at its outer end at a tapered bore 98 in the spindle 11. The tapered bore 98 is made to a larger dimension than the outer taper 50 of the tool chuck 10, so as to provide a clearance therebetween. The outer end of the tapered bore 98 terminates at the inner end of the outer tapered chuck seat 51. The outer tapered chuck seat 51 extends outwardly to the outer end of the spindle 11, as shown in FIG. 1.

When the collet 94 is moved to the right from the position shown in FIG. 1, to a position for unlocking the chuck 10 and releasing the same from the spindle 11, the collet fingers 93 are expanded to their unstressed condition since the lugs 92 will be moved lonitudinally to the right, and will flex outwardly and move along the tapered bore or frusto-conical surface 90 and into the enlarged cylindrical bore 95. It will be seen that when the collet 94 is moved to the right, from the position shown in FIG. 1, that the movement of the lugs 92 into the tapered bore 99 and thence into the cylindrical bore 95, will permit the collet fingers 93 to be moved radially outward to clear the retention knob 54 and allow it to be moved longitudinally past the lugs 92 and out of the collet 94.

As shown in FIG. 1, a collet body 105 is movably mounted in the longitudinal extended axial bore 104 which communicates at its inner end with a reduced diameter axial bore 103. The numeral 107 designates the elongated cylindrical body of a conventional draw bar which is slidably mounted in the axial bore 103. The outer or front end of the draw bar body 107 is provided with a reduced diameter end portion which forms an annular shoulder 106 on which is seated the inner end of the collet body 105. The collet body 105 is provided with a stepped diameter longitudinal axial bore 111. The reduced diameter front end of the draw bar body 107 is piloted in the largest diameter outer end portion of the collet body bore 111. The collet body 105 is releasably secured on the draw bar body 107 by a retainer assembly, generally indicated by the numeral 100. The retainer assembly 100 includes a suitable machine screw 110 which has its threaded outer end 109 threadably mounted in a threaded bore 108 formed in the outer end of the draw bar body 107. The collet retainer screw 110 is provided with an enlarged head 113 and an integral smaller head 112. A pluality of suitable disc type springs 114 is operatively mounted around the screw 110 in a position between the inner end of the screw head 113 and the front end face 115 of the collet body 105. A suitable disc type spring 114 is one on the market known as a belleville washer. The springs 114 are under a preload torque. The outer end of the screw head 112 is indicated by the numeral 116, and it is adapted to engage the outer end 117 of the spring plunger 70 when the draw bar and tool holder gripping means 13 is activated to the right from the position shown in FIG. 1, for ejecting the tool holder 10, as described more fully hereinafter.

In operation, the draw bar and tool gripping means 13 are actuated to the left to the solid line position shown in FIG. 1 for retaining the tool holder 10 in an operative position in the spindle 11. In order to eject the tool holder 10 from the spindle 11, the draw bar and tool holder gripping means 13 are actuated to the right from the position shown in FIG. 1. It will be understood that the draw bar body 107 may be actuated between a tool holder locked and unlocked position by any suitable means. One suitable means for actuating the draw bar body 107 is illustrated in U.S. Pat. No. 3,868,886, and another suitable means for operating the draw bar body 107 is shown in detail in our co-pending continuation-in-part patent application entitled "HIGH SPEED SPINDLE AND DRAW BAR ASSEMBLY", filed simultaneously herewith under Ser. No. 767,013, on Feb. 9, 1977.

As the draw bar body 107 is moved to the right, from the position shown in FIG. 1, the collet 94 is moved to the right, and the collet fingers 93 are allowed to expand to their unstressed position when the lugs 92 are moved to the right into the enlarged cylindrical bore 95. Continued movement to the right by the draw bar body 107 causes the outer end 116 of the screw head 112 to engage the end 117 of the plunger shaft 71, and to move the plunger 70 to the right, from the clamped position shown in FIG. 1, and to compress spring 77. The draw bar body 107 continues to move the plunger 70 to the right to the unclamped position shown in broken lines wherein the plunger body is indicated by the numeral 72a.

It will be understood that during the time that the plunger 70 is being moved to the unclamped position that a conventional tool changer arm is positioned in the V-shaped slot 48 on the tool holder body 46 in a tool holder gripping engagement. The movement of the plunger 70 to the right to an unclamped position permits the locking balls 83 to move radially inward and be released from their clamped position against the tapered surface 102, and the tool holder 10 is then urged outward or to the right, as viewed in FIG. 1, by means of the action of the compressed spring 77 having its outer end seated against the shoulder 78 in the work holder bore 76, which spring action provides an ejection bias on the tool holder 10 to assist the aforementioned tool changer arm to axially remove the tool holder 10 from the spindle 11.

It will be seen that the last described biased ball locking means provides a positive retention means for retaining the tool holder 10 in the spindle 11 in addition to the retention function of the collet 94. The ball locking means of the present invention provides the tool holder 10 with an inherent safety retention means in case of a breakage of the collet 94. In case of a breakage of the collet 94, when the spindle 11 is running, the spring biased balls 83 would hold the tool holder 10 in the spindle 11.

It will be seen that the two spaced apart tapered bores or seats 51 and 52 function together to provide one overall tool holder seat or socket for the tool holder or chuck 10. The spaced apart tapered bores 51 and 52 provide a two-point grip on the tool holder 10 to prevent tilting or transverse movement of the tool holder 10 in the spindle.

While it will be apparent that the preferred embodiment of the invention herein disclosed is well calculated to fulfill the objects above stated, it will be appreciated that the invention is susceptible to modification, variation and change.

What is claimed is:

1. In a machine tool having a rotatable spindle with a bore formed therethrough, and wherein said spindle is provided with a tool holder seat comprising an inwardly coverging frusto-conical socket communicating with one end of said bore in said spindle, the combination comprising:
   (a) a tool holder, said tool holder having a frustoconical shank and adapted to be operatively mounted in said spindle socket;
   (b) a retention means carried by said tool holder;
   (c) a tool holder gripping means operatively mounted in said spindle bore for releasable gripping engagement with said retention means for releasably retaining said tool holder in said spindle;
   (d) a draw bar opertively mounted in said spindle bore for axial movement with repect to said spindle to operate said tool holder gripping means between a tool holder locked position and a tool holder unlocked position;
   (e) a plurality of self-locking balls operatively mounted in said tool holder and being normally in a locked position for locking the tool holder in said spindle, and being adapted to be moved to an unlocked position by said draw bar when the draw bar is moved to a tool holder unlocked position;
   (f) spring biased means for normally biasing each of said locking balls radially outward into locking engagement with the spindle;
   (g) said spring biased means includes a plunger member engageable with each of said locking balls and a spring means for normally biasing said plunger member in a direction to move each of said locking balls radially outward into locking engagement with said spindle; and
   (h) said spindle bore includes a frusto-conical inwardly converging seat for releasable locking engagement with said plurality of said locking balls.

2. In a machine tool having a rotatable spindle with a bore formed therethrough, and wherein said spindle is provided with a tool holder seat comprising an inwardly converging frusto-conical socket communicating with one end of said bore in said spindle, the combination comprising:
   (a) a tool holder having a frusto-conical shank operatively mounted in said spindle socket;
   (b) a plurality of self-locking means operatively mounted in said tool holder and being normally in a locked position for locking the tool holder in the spindle, and being adapted to be moved to an unlocked position, said self-locking means comprising:
      (1) a plurality of locking balls movably mounted in the tool holder shank for radial inward and outward movement; and,
      (2) spring biased means for normally biasing each of said locking balls radially outward into locking engagement with the spindle, said spring biased means including:
         (A) a plunger member engageable with each of said locking balls and a spring means for normally biasing said plunger member in a direction to move each of said locking balls radially outward into locking engagement with the spindle; and
   (c) said spindle bore includes a frusto-conical inwardly coverging seat for releasable locking engagement with said plurality of said locking balls.

3. The machine tool spindle and tool holder structure as defined in claim 2, wherein:
   (a) said tool holder seat includes a plurality of spaced apart aligned tapered bores.

4. The machine tool spindle and tool holder structure as defined in claim 2, wherein:
   (a) said tool holder seat comprises an inner tapered bore spaced apart from an aligned outer tapered bore.

5. The machine tool spindle and tool holder structure as defined in claim 4, wherein:
   (a) said locking ball frusto-conical inwardly converging seat is formed in said spindle bore between said socket inner and outer tapered bores.

6. A tool holder having a cylindrical body portion (46) in the front end that is open at its outer end and adapted to receive a tool, and a fruto-conical shank (49) adapted to be operatively mounted in a spindle socket, comprising;
   (a) an axial bore (76) extending therethrough;
   (b) a plurality of radially extending bores (84) adjacent the rear end of said shank and communicating with said axial bore;
   (c) a plurality of self-locking balls (83) movably mounted in said radially extending bores;
   (d) a plurality of retaining means (87) retaining said self-locking balls and threadably mounted in a threaded bore (89) disposed parallel to, but spaced from, the adjacent said bore (84);
   (e) a retention knob (54) threadably mounted at said rear end of said shanks and having an axial bore (66) extending therethrough;
   (f) a spring plunger (70) having:
      (1) an elongated cylindrical shaft (71) slidably mounted through said axial bore (66) of said retention knob; and
      (2) a tapered body portion (72) which integrally formed has an annular shoulder portion (73);
   (g) a compression spring (77) mounted within said axial bore (76) of said tool holder and abutting said shoulder portion of said spring plunger to normally bias said plunger outwardly of said tool holder shank;
   whereby the self-locking balls are retained in their normal outward position by engaging said tapered body portion (72) of said spring plunger and thereby adapted to engage a tapered surface of said spindle socket during machining operations, and during non-machining or tool changing operations said spring-loaded plunger is adapted to be moved axially thereby causing said locking balls (83) to move radially inward and releasing said tool holder from said spindle socket.

* * * * *